Patented May 2, 1933

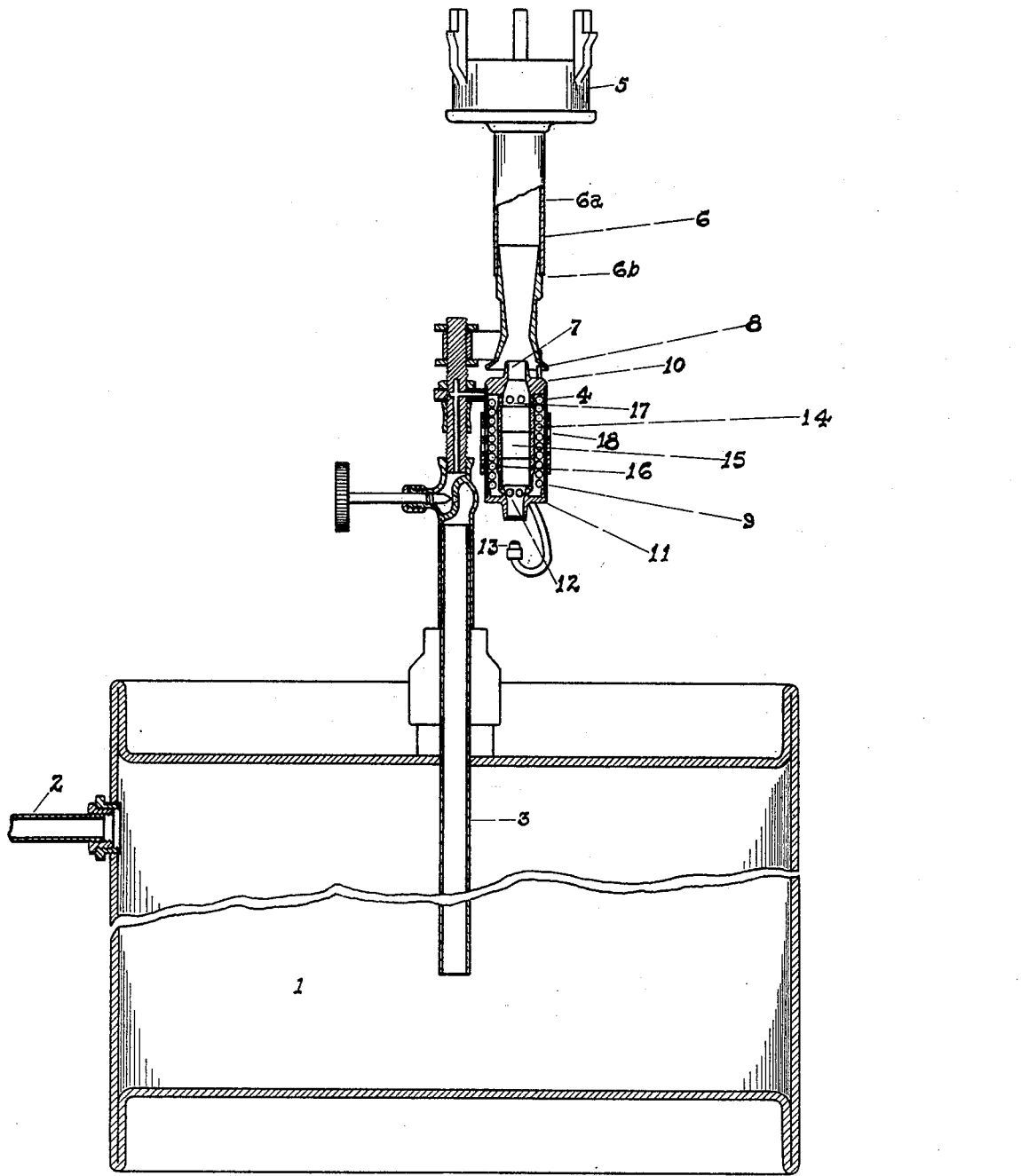

1,906,335

UNITED STATES PATENT OFFICE

EMORY LEE RATHBURN, OF ALEXANDRIA, INDIANA, ASSIGNOR, BY MESNE ASSIGNMENTS, TO THE MANTLE LAMP COMPANY OF AMERICA, OF CHICAGO, ILLINOIS, A CORPORATION OF ILLINOIS

FUEL-HEATING CATALYZING BURNER

Application filed June 14, 1930. Serial No. 461,250.

The invention relates to fuel burners with which a catalytic agent is used to facilitate combustion of the fuel at the burner.

The invention will be best understood if reference be had to the accompanying drawing in which the figure is a vertical sectional view of an apparatus embodying the invention.

Referring to the drawing, 1 is a source of liquid-fuel which may be a reservoir having an inlet 2 for compressed air and a valve-controlled outlet tube 3 for fuel leading from a point near the bottom thereof to a catalyzer and mixer 4 which communicates with a burner 5, of any suitable type, through a Bunsen tube 6, the upper part 6a of which is separable from the catalyzer and mixer at 6b. Into said Bunsen tube 6, a small nozzle 7 discharges the fuel mixture emanating from said catalyzer and mixer 4. The lower end 8 of the Bunsen tube 6 is flared and is so shaped and related to the nozzle 7 as to establish a current of high velocity within the Bunsen tube 6.

The catalyzer and mixer 4 is provided with a casing 9 having a cap 10 terminating in the aforesaid nozzle 7, and with a bottom 11 that is provided with Venturi tube 12 through which a jet of the fuel mixture, supplied by a nozzle 13, is impelled. This nozzle 13 is in communication with a pre-heating coil 14 leading from the upper end of the valve-controlled outlet tube 3 and disposed within the casing 9.

Within the pre-heating coil 14 is a tubular catalyst 15 having exterior vertical ribs 16 which center it relatively to said coil 14, said catalyst 15 being supported by said Venturi tube 12, and, at its top, being in contact with a circular flange 17 depending from the cap 10.

The Venturi tube 12 and the depending flange 17 are both perforated in order to establish a circuit through and over said tubular catalyst 15, whereby the fuel mixture may flow in contact with the inner and the outer surface of said catalyst 15, the current thus established being induced at the perforations in the Venturi tube 12.

The apparatus may be provided with temperature-controlling means, such as controlled air-admitting openings 18 in the casing 9, whereby the temperature of the mixture flowing through the coil 14 may be maintained above the boiling point of said mixture, the correct adjustment of the air-controlling device being determined by the character of the flame at the burner. In order that the pressure in the space outside of the tubular catalyst 15 may be sub-atmospheric and thus permit an inflow of air into said space, the capacity of the openings in the flange 17 should be less than the capacity of the perforations in the Venturi tube 12.

The material of which the tubular element 15 is composed may be any substance which is capable of inducing combustion of small portions of the flowing mixture, to thereby produce products whch may be blended with and advantageously heat the entire mixture as it flows to the place of combustion, a highly-efficient catalytic substance being preferable.

Having thus described my invention, what I claim is:

1. A fuel-heating catalyzing burner including a source of liquid fuel, a nozzle communicating with said source of liquid fuel, a fuel and air mixer aligned with said nozzle, a catalyst, and a pre-heating duct disposed between said source of liquid fuel and said nozzle and adjacent said catalyst.

2. A fuel-heating catalyzing burner including a source of liquid fuel, a nozzle communicating with said source of liquid fuel, a fuel and air mixer aligned with said nozzle, a tubular catalyst, and a pre-heating duct disposed between said source of liquid fuel and said nozzle and adjacent said tubular catalyst.

3. A fuel-heating catalyzing burner including a source of liquid fuel, a nozzle communicating with said source of liquid fuel, a fuel and air mixer aligned with said nozzle, a catalyst adjacent said mixer, means for mixing the pre-heated fuel with air, and a burner communicating with said means.

4. A fuel-heating catalyzing burner including a source of liquid fuel and an outlet, an intervening tubular catalyst, and a pre-heating coil for liquid fuel surrounding said tubular catalyst.

5. A fuel-heating catalyzing burner including a source of liquid fuel and an outlet, an intervening tubular catalyst, and a pre-heating coil for liquid fuel surrounding said tubular catalyst, the parts being arranged to establish a circuit through and over said tubular catalyst.

6. A fuel-heating catalyzing burner including a source of liquid fuel, a nozzle communicating with said source of liquid fuel, a fuel and air mixer, a catalyst, a pre-heating duct disposed between said source of liquid fuel and said nozzle and adjacent said catalyst, and means adjacent said catalyst whereby the temperature of the mixture flowing through said pre-heating duct may be controlled.

7. A fuel-heating catalyzing burner including a source of liquid fuel, a nozzle communicating with said source of liquid fuel, a fuel and air mixer, a catalyst, a pre-heating duct disposed between said source of liquid fuel and said nozzle and adjacent said catalyst, and regulable air-admitting openings adjacent said catalyst whereby the temperature of the mixture flowing through said pre-heating duct may be controlled.

In testimony whereof I do affix my signature.

EMORY LEE RATHBURN.